United States Patent [19]

Eady

[11] 4,039,221
[45] Aug. 2, 1977

[54] SAFETY WIND DEFLECTOR

[76] Inventor: Clarence Eady, 4223 Albert St., Burnaby, British Columbia, Canada, V5C 2E7

[21] Appl. No.: 652,789

[22] Filed: Jan. 27, 1976

[51] Int. Cl.² .................... B60R 1/06; B60R 1/12; B60J 1/20
[52] U.S. Cl. .................... 296/84 B; 296/84 C
[58] Field of Search .................. 296/84 C, 84 B, 90, 296/84 R; 350/307

[56] References Cited

U.S. PATENT DOCUMENTS

| 1,544,244 | 6/1925 | Lehmann | 296/84 C |
| 2,477,888 | 8/1949 | Milne | 296/84 C |
| 2,696,154 | 12/1954 | Eaton | 296/84 C |

FOREIGN PATENT DOCUMENTS 876,814   5/1953   Germany ................. 296/84 C

Primary Examiner—Richard J. Johnson

[57] ABSTRACT

A safety wind deflector is disclosed comprising a transparent member that extends upwardly from the bottom to the top of a vehicle side window and outwardly from the side window, the deflector being positioned in between a vent window and the side window of a vehicle. A sealing member is provided along the edge of the deflector that abuts the area of the vehicle in between the vent window and the side window. The wind deflector prevents wind from being directed into the driver's face at speeds between 30 and 55 miles an hour and any dirt or other debris carried by the wind. The wind deflector is especially useful when mounted in front of a side view mirror on the vehicle since the mirror, especially the larger truck type mirrors, deflect wind and road debris carried by the wind into the face of a driver.

1 Claim, 5 Drawing Figures

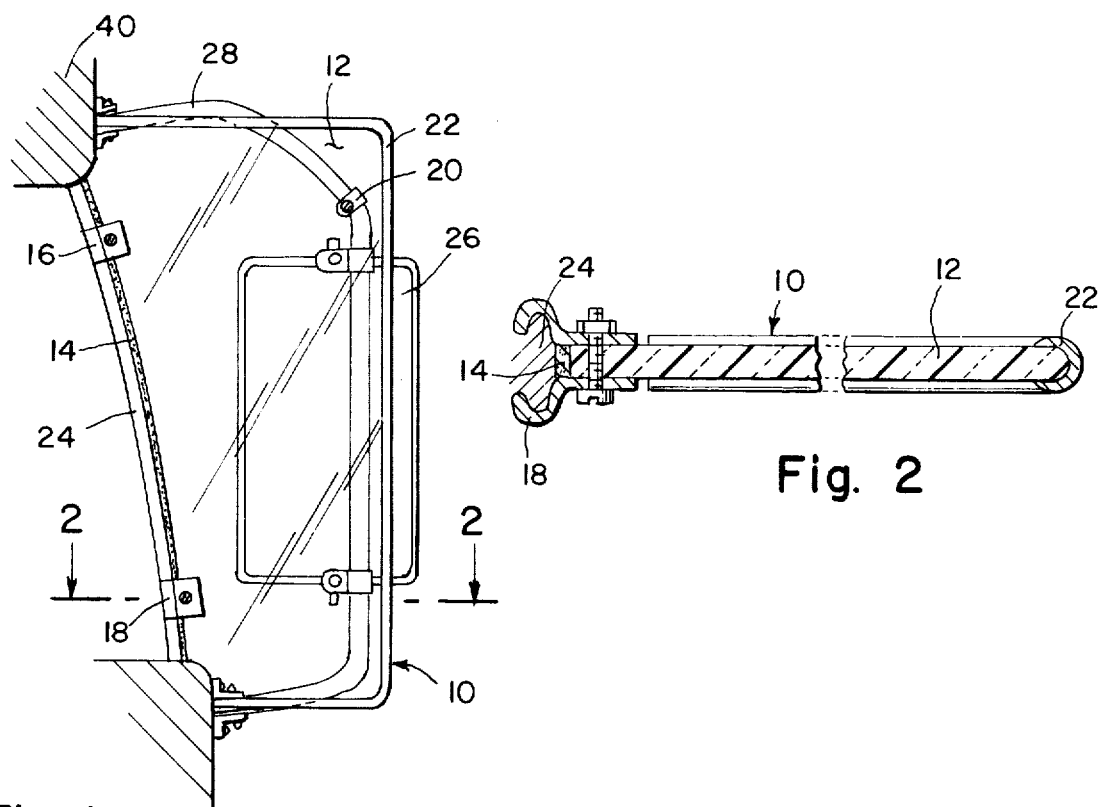
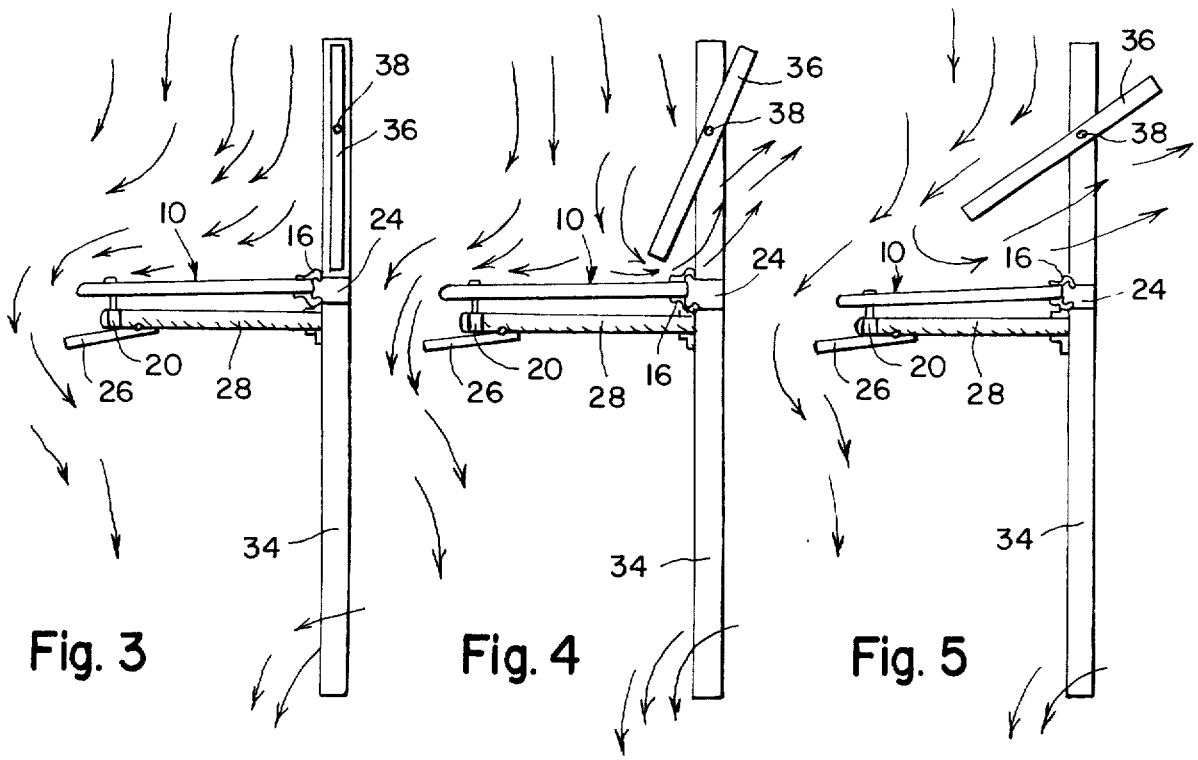

SAFETY WIND DEFLECTOR

SUMMARY OF THE INVENTION

The present invention relates to an automotive vehicle safety wind deflector comprising in combination an openable and closable vehicle side window, a vent window in front of the side window and a transparent wind deflector extending upwardly from the bottom to the top of said side window and outwardly from the side window. The wind deflector is positioned in between the side window and the vent window and in one embodiment the deflector is sealed to the side of a vehicle. The deflector may be mounted on vehicles having a member for separating the side window and the vent window such as a down bar and in vehicles of this type the deflector is joined to the down bar along one edge of the deflector, the edge of the deflector joined to the down bar having a seal member along such edge to prevent air currents from passing in between this edge and the vehicle.

The deflector is especially useful when mounted in front of or in back of a mirror mounted adjacent to he side window of a vehicle, the deflector being attachable to the mirror in some instances.

BRIEF DESCRIPTION OF THE SEVERAL VIEWS OF THE DRAWING

FIG. 1 is a front elevation illustrating a wind deflector mounted on the side of a vehicle and in front of a side view mirror according to one embodiment of the present invention.

FIG. 2 is a plan view in section taken along the line 2—2 of FIG. 1.

FIGS. 3, 4 and 5 are plan views illustrating the air flow around a wind deflector mounted on the side of a vehicle in between a vent window a mirror and a side window according to another embodiment of the present invention.

DETAILED DESCRIPTION

Wind deflected off of the side of a vehicle when a vehicle is in motion tends to be a safety hazard for the driver at speeds from about 30 to about 55 miles per hour since the wind tends to carry airborne debris such as dirt from the road, insects and other foreign objects that fly into the face and eyes of the driver. Passenger compartment or cab ventilation is provided by an arrangement of windows in most vehicles by means of air flow devices underneath the dashboard of the vehicle; however, increased ventilation is required in certain climates and during certain seasons that is beyond the capability of the other air supply systems in the vehicle cab. In order to provide increased air circulation, vehicular windows are openable and closable and sometimes are arranged so that a side window which is openable and closable is positioned to the rear of a vent window the latter being capable of swinging on an axis or pivot outwardly into the direction of air flow to act as either an air scoop and/or a vent that allows air flow over one edge of the window to draw a vacuum on the inside of the passenger or vehicle compartment and thereby pull air out of the compartment. Although the latter arrangement is effective under most driving conditions to provide additional ventilation for a vehicle compartment, the positioning of a side view mirror on the vehicle in the vicinity of the side window next to the driver tends to deflect air into the passenger compartment along with the aforementioned airborne debris which presents a safety hazard in the operation of the vehicle. This is especially the case where relatively large side view mirrors are positioned on the vehicle in the area of the driver's compartment such as the type of mirror used on a truck that extends upwardly for a length almost the full height of the side window.

The prior art disclosed various wind deflector devices such as those of U.S. Pat. Nos. 3,311,406 Fritsch; 3,281,181 Palmer; 3,072,431 Shumaker; 3,063,748 Keeler; 3,059,540 Robinson; 3,010,754 Shumaker; 2,933,344 Shumaker; and 2,727,782 Reed.

None of the foregoing references disclose means for obviating the flow of wind into a vehicle while the vehicle is in motion so that the wind is not directed into the face of the driver nor do these references disclose means for preventing wind deflected off of a side view mirror from blowing into the face of a driver of a vehicle.

It is therefore an object of the present invention to overcome these and other difficulties encountered in the prior art.

It is a further object of the present invention to provide means for preventing wind from blowing into a vehicle having an openable side window and vent window.

It is a further object of the present invention to provide means to prevent wind from being reflected off of a side view mirror into the driver's compartment of a vehicle.

It is a further object of the present invention to provide better draft free circulation of air int he driver's compartment of a vehicle.

It is another object of the present invention to provide a gentle and easy air exchange in the driver's compartment of a vehicle or passenger compartment with a minimum amount of wind noise.

These and other objects have been achieved according to the present invention and will become apparent by reference to the disclosure and claims that follow as well as the appended drawing.

Referring to the drawing, and FIGS. 1 through 5, a wind deflecting member 10 is illustrated comprising a transparent member 12 such as clear plexiglass (trademark) or equivalent acrylic polymer or other transparent plastic material. Deflector 12 may also be made of a safety automotive laminate glass and the art known equivalents thereof. The clear or transparent deflector 12 may also be fabricated from a tinted or a polarized transparent material which is also known in the art. Deflector 12 extends upwardly from an openable and a closable window 34 mounted in the side of a vehicle 40 and is attached to the down bar 24 of such vehicle along one edge of the deflector 12 by means of clamps 16 and 18 which clampingly engage down bar 24. A soft plastic seal member 14 is positioned in between the edge of the deflector and the down bar 24 to prevent wind from passing around the edge of the deflector 12 positioned next adjacent the vehicle 40. Trim material 22 is optionally provided on the edge of the deflector 12 that extends outwardly from the side window 34. A mirror 26 is illustrated in FIGS. 1 through 5 in front of which the deflector 12 is positioned and to which deflector 12 is attached by means of a clamp 20 secured to mirror support bar 28. Deflector 12 may be mounted either in front of or in back of the mirror 26. The deflector 12 is positioned in between a vent window 36 which pivotally opens on a pivot 38 and a openable and closable side window 34 such as a door mounted side window and may be opened and closed by lowering and raising the window into and out of the door although other openable windows such as windows that may be swung out from the top thereof by means of hinges secured to the top edge of the window in the side of a vehicle are also within the scope of the present invention.

In use, the air flow around the passenger compartment of a vehicle as shown by the arrows of FIGS. 3-5 in the drawing illustrate that wind coming from the front of the vehicle will pass or be deflected around the safety wind deflector 10 while the side window 34 is opened, some air being drawn out of the side window 34 when the vent window 36 is closed as illustrated in FIG. 3. As the vent window 36 is partially opened as illustrated by FIG. 4, some air flow is directed into the cab of the vehicle while the majority of air flows around deflector 10 and by the open window 34 without being deflected into the face of the driver or the passengers of the vehicle. The air flow out of window 34 is increased slightly when the vent window 36 is partially opened as illustrated in FIG. 4.

As the vent window 36 is fully opened, heavier air flow into the passenger compartment or cab of the vehicle is obtained through the vent window whereas the side window 34 which is in an open position does not have air deflected into it as would be the case if deflector 10 were not in position in front of mirror 26.

By providing a deflector 10 as illustrated in the drawings and particularly as shown by the illustrations of FIGS. 3-5, wind ordinarily deflected off of mirror 26 and blown into the face of the passengers and/or driver of the vehicle is deflected to the back of the vehicle.

Although the invention has been described by reference to some embodiments, it is not intended that the novel wind deflector be limited thereby but that modifications thereof are intended to be included as falling within the broad scope and spirit of the foregoing disclosure, the following claims and the appended drawing.

What is claimed is:

1. An automotive vehicle safety wind deflector comprising in combination an openable and closeable vehicle side window means, vent window means in front of said side window, mirror means adjacent said side window, said mirror means being secured to the side of said vehicle, transparent wind deflector means extending upwardly from the bottom to the top of said side window means and outwardly from said side window means, side wind deflector means being positioned in between said side window means and said vent window means, werein said wind deflector means is secured to said mirror means, said deflector means mounted in front or in back of said mirror means.

* * * * *